United States Patent
Escobedo

(10) Patent No.: US 9,613,030 B2
(45) Date of Patent: Apr. 4, 2017

(54) DEVICE ORIENTATION BASED TRANSLATION SYSTEM

(71) Applicant: PAYPAL, INC., San Jose, CA (US)

(72) Inventor: Miguel Angel Escobedo, Austin, TX (US)

(73) Assignee: PayPal, Inc., San Jose, CA (US)

(*) Notice: Subject to any disclaimer, the term of this patent is extended or adjusted under 35 U.S.C. 154(b) by 0 days.

(21) Appl. No.: 15/055,305

(22) Filed: Feb. 26, 2016

(65) Prior Publication Data

US 2016/0179791 A1 Jun. 23, 2016

Related U.S. Application Data

(63) Continuation of application No. 13/426,394, filed on Mar. 21, 2012, now Pat. No. 9,292,498.

(51) Int. Cl.
*G06F 17/28* (2006.01)
*G10L 13/04* (2013.01)

(52) U.S. Cl.
CPC .......... *G06F 17/289* (2013.01); *G10L 13/043* (2013.01)

(58) Field of Classification Search
CPC ........ G06F 17/2785; G06F 8/20; G06F 8/315; G10L 15/18; G10L 15/1815; Y10S 707/99944
See application file for complete search history.

(56) References Cited

U.S. PATENT DOCUMENTS

| 7,020,601 | B1 | 3/2006 | Hummel et al. | |
|---|---|---|---|---|
| 7,801,721 | B2* | 9/2010 | Rosart | G06F 17/289 704/2 |
| 8,386,231 | B2* | 2/2013 | LeBeau | G06F 17/28 704/2 |
| 8,725,490 | B2* | 5/2014 | Athsani | G06F 17/289 703/3 |
| 8,775,156 | B2* | 7/2014 | Lebeau | G06F 17/28 704/2 |
| 8,842,909 | B2* | 9/2014 | Koo | G06F 17/289 382/165 |
| 8,869,071 | B2* | 10/2014 | Cho | G06F 1/1694 345/157 |
| 8,954,314 | B2* | 2/2015 | Powalowski | G06F 3/0487 704/2 |
| 8,965,129 | B2* | 2/2015 | Rogowski | G06F 17/289 382/181 |

(Continued)

*Primary Examiner* — Matthew Baker
(74) *Attorney, Agent, or Firm* — Haynes and Boone, LLP

(57) ABSTRACT

A method for translating content includes providing a plurality of content on a user device. The plurality of content is associated with a first region display mode. The plurality of content is displayed on the user device in the first region display mode. A predefined orientation is then detected in the user device. The plurality of content is then translated according to a second region display mode to produce a plurality of translated content. The plurality of translated content is then displayed on the user device. In different embodiments, the plurality of content may have been previously provided on the user device, may be retrieved over a network by the user device, or my be received through a user interface on the user device. A specific embodiment allows a user to rotate the user device 180 degrees to quickly and easily translate text displayed on the user device.

20 Claims, 16 Drawing Sheets

(56) References Cited

U.S. PATENT DOCUMENTS

| | | | |
|---|---|---|---|
| 2001/0032070 A1* | 10/2001 | Teicher | G06F 17/28 704/2 |
| 2003/0120478 A1* | 6/2003 | Palmquist | G06F 17/2863 704/3 |
| 2003/0149557 A1 | 8/2003 | Cox et al. | |
| 2004/0158471 A1 | 8/2004 | Davis et al. | |
| 2005/0192794 A1 | 9/2005 | Ertemalp et al. | |
| 2007/0004451 A1* | 1/2007 | C. Anderson | G06F 1/1626 455/556.1 |
| 2008/0233980 A1* | 9/2008 | Englund | G06F 17/289 455/466 |
| 2009/0106016 A1* | 4/2009 | Athsani | G06F 17/289 704/3 |
| 2009/0198486 A1* | 8/2009 | Chang | G06F 17/289 704/2 |
| 2010/0030549 A1* | 2/2010 | Lee | G06F 1/1626 704/4 |
| 2011/0301835 A1 | 12/2011 | Bongiorno | |
| 2012/0035908 A1* | 2/2012 | LBeau | G06F 17/28 704/2 |
| 2012/0163668 A1* | 6/2012 | Englund | G06F 17/289 382/103 |
| 2013/0004068 A1* | 1/2013 | Koo | G06F 17/289 382/165 |
| 2013/0103383 A1* | 4/2013 | Du | G06F 3/0488 704/3 |
| 2013/0108115 A1* | 5/2013 | Hwang | G06K 9/033 382/106 |
| 2013/0253900 A1 | 9/2013 | Escobedo | |
| 2014/0297256 A1* | 10/2014 | Rogowski | G06F 17/289 704/2 |

* cited by examiner

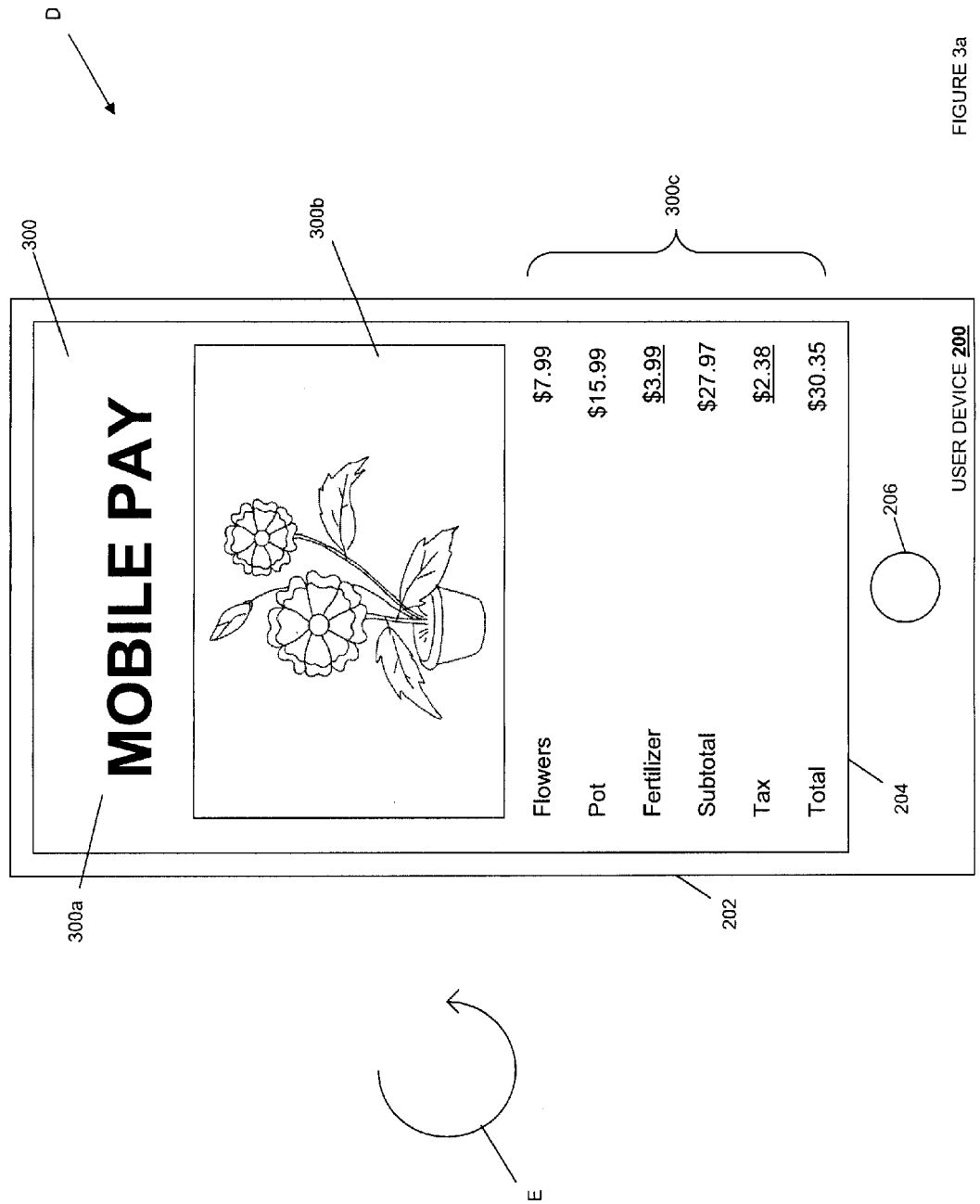

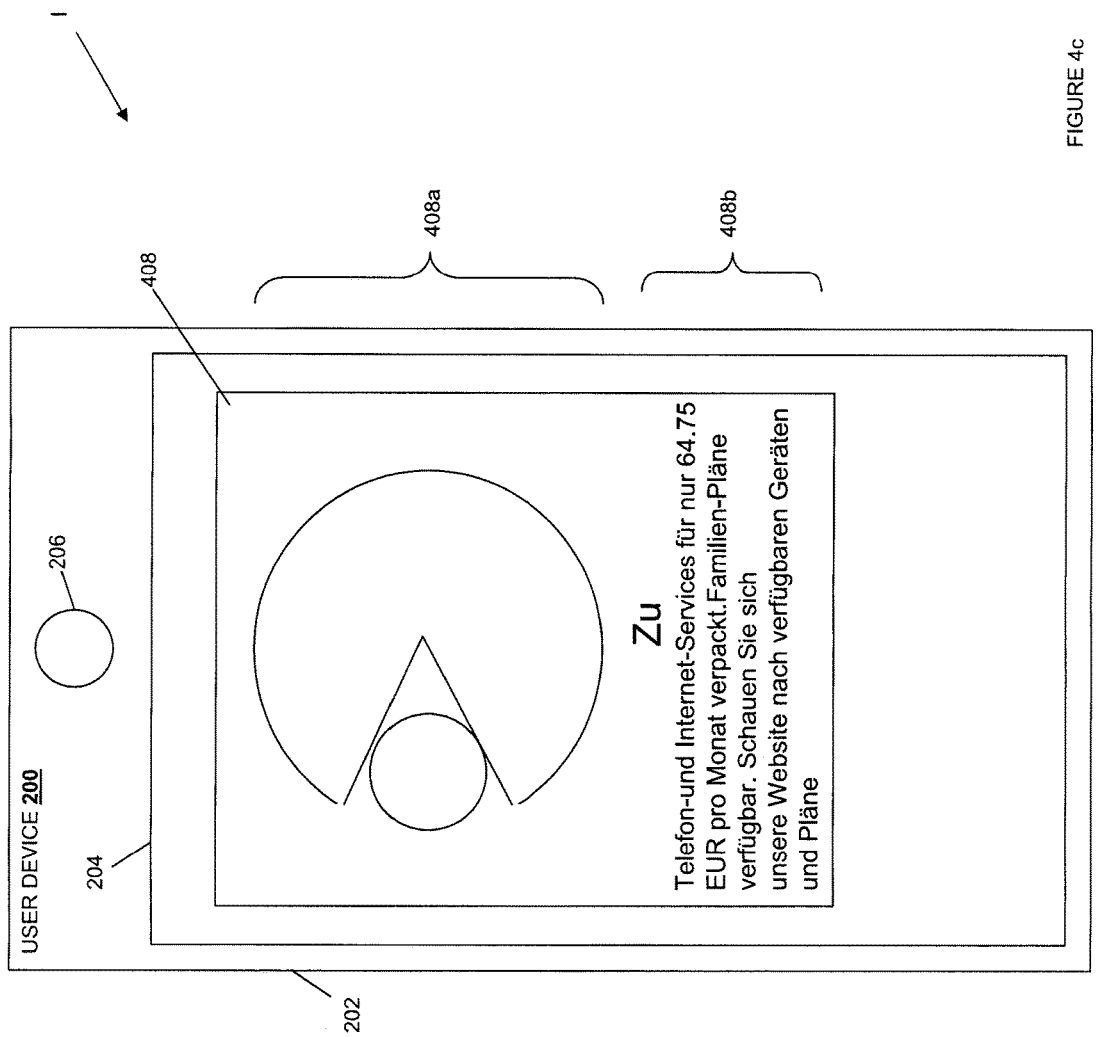

DEVICE ORIENTATION BASED TRANSLATION SYSTEM

CROSS-REFERENCE TO RELATED APPLICATIONS

This is a Continuation application to U.S. Utility application Ser. No. 13/426,394 filed Mar. 21, 2012 entitled "DEVICE ORIENTATION BASED TRANSLATION SYSTEM,", the disclosure of which is incorporated herein by reference in its entirety.

BACKGROUND

Field of the Invention

The present invention generally relates to mobile user devices and more particularly to a device orientation based translation system on a mobile user device.

Related Art

As the world becomes more interconnected and people and businesses become global in their interactions, the ability to communicate becomes an issue. People and businesses in a given region typically utilize, for example, different languages and currencies than those in other regions. These differences tend to introduce barriers to communication between parties.

Conventionally, there are a number of steps that must be taken in order to surmount the communication barriers discussed above. For example, businesses may train their employees, or individuals may educate themselves, to operate in other regions such that they speak the appropriate language and are able to convert currency when dealing with those parties. However, such training is extremely time consuming and expensive, and limits the ability to communicate to a relatively small subset of individuals that have been trained to do so in specific regions.

Furthermore, for people and/or businesses that have not put forth the time, effort, and expense to train themselves to communicate in a specific region, typical solutions to the communication issues discussed above include translation books that require the user to look up foreign words in their native language, and currency calculators that require the user to enter a native or foreign currency to determine a desired conversion. Each of these solutions requires a significant amount of time and effort from the user each time the user wishes to communicate, which makes communication awkward and ineffective. Furthermore, the user must be prepared with the translation book and currency calculator that are specific to the region in which the user is located in order to be able to communicate, which requires significant planning and expense, particularly for a user that travels to a variety of different regions frequently.

Thus, there is a need for an improved content translation system.

SUMMARY

According to one embodiment, a method for translating content includes a user device that displays a plurality of content in a first region display mode that causes the plurality of content to be displayed using a first language and/or a first currency. A user of the user device may then change the orientation of the mobile device to a predefined orientation. The mobile device will detect the predefined orientation and, in response, translate the plurality of content according to a second region display mode to produce translated content which includes the plurality of content in a second language and/or a second currency. The user device then displays the translated content.

The plurality of content and its associated first region display mode may have been previously provided on the user device (e.g., in an application previously provided on the user device), may be retrieved over a network, (e.g., from a website), and/or may be received from a user interface on the user device (e.g., from a microphone, keyboard, camera, etc.) The translation of the plurality of content according to the second region display mode may have been previously performed and stored on the user device or in a database that is coupled to the user device over a network. The translation of the plurality of content according to the second region display mode may also be performed by the user device in response to the detection of the predefined orientation or by a translation device that is coupled to the user device over a network.

In an embodiment, translation of the plurality of content according to the second region display mode is performed in response to determining that the second region display mode is associated with the predefined orientation. In one example, the second region display mode may have been previously associated with the predefined orientation. In another example, the user device may determine a current location of the user device in response to detecting the predefined orientation, and the second region display mode that is used to translate the plurality of content may be associated with the current location.

As a result, a user may quickly and easily retrieve translations of content that is provided on their user device simply by reorienting the user device. This may be particularly useful when the user is located in a region in which they are unfamiliar by allowing the user to use the user device to capture content in the foreign language and translate it, or provide content in their native language and translate it to a foreign language for communication with a speaker of that foreign language.

These and other features and advantages of the present disclosure will be more readily apparent from the detailed description of the embodiments set forth below taken in conjunction with the accompanying figures.

BRIEF DESCRIPTION OF THE FIGURES

FIG. 3a is a front view illustrating an embodiment of a user device displaying a plurality of content in a first region display mode;

FIG. 4c is a front view illustrating an embodiment of the user device of FIG. 4b moved to a different orientation and, in response, displaying the plurality of content in a second region display mode;

Figure 1:
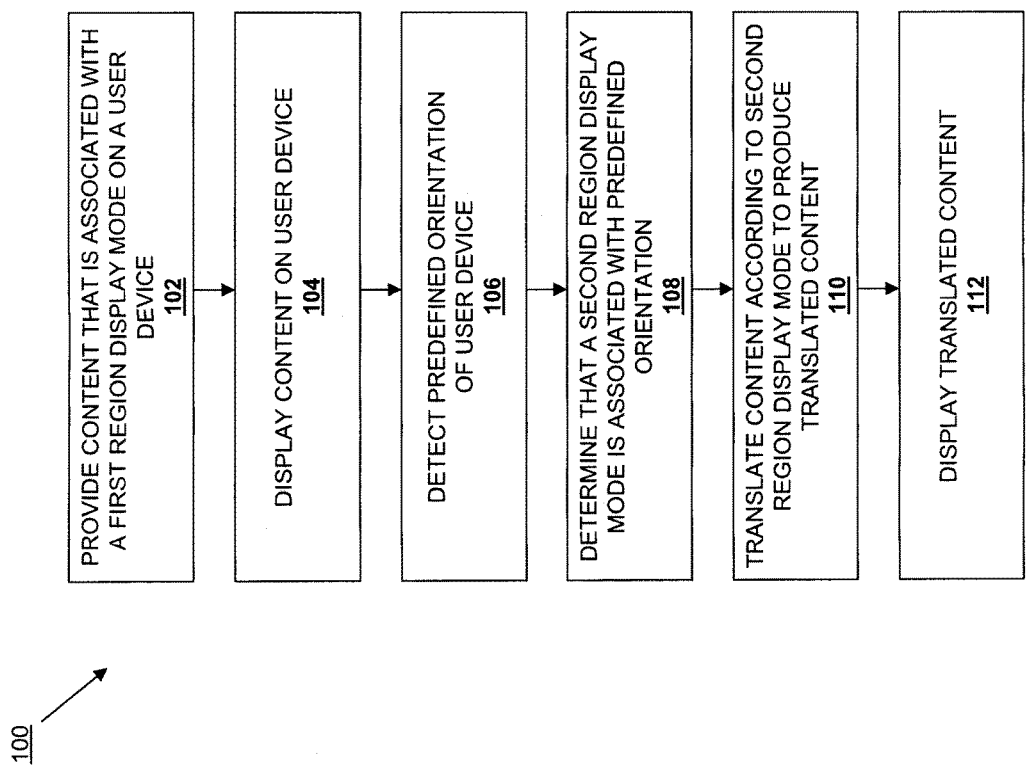
FIG. 1 is a flow chart illustrating an embodiment of a method for translating content.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for translating content on a user device. A plurality of content that is associated with a first region display mode is provided on a user device. The user device displays the plurality of content according to the first region display mode, which may include displaying the plurality of content in a first language. The user of the user device may then reorient the user device to a predefined orientation in order to have the user device display translated content that is produced by translating the plurality of content according to a second region display mode, which may include translating the plurality of content from the first language to a second language. The system and method allow a user to quickly and easily translate content displayed on, and in some embodiments, provided to the user device.

Figure 2A:
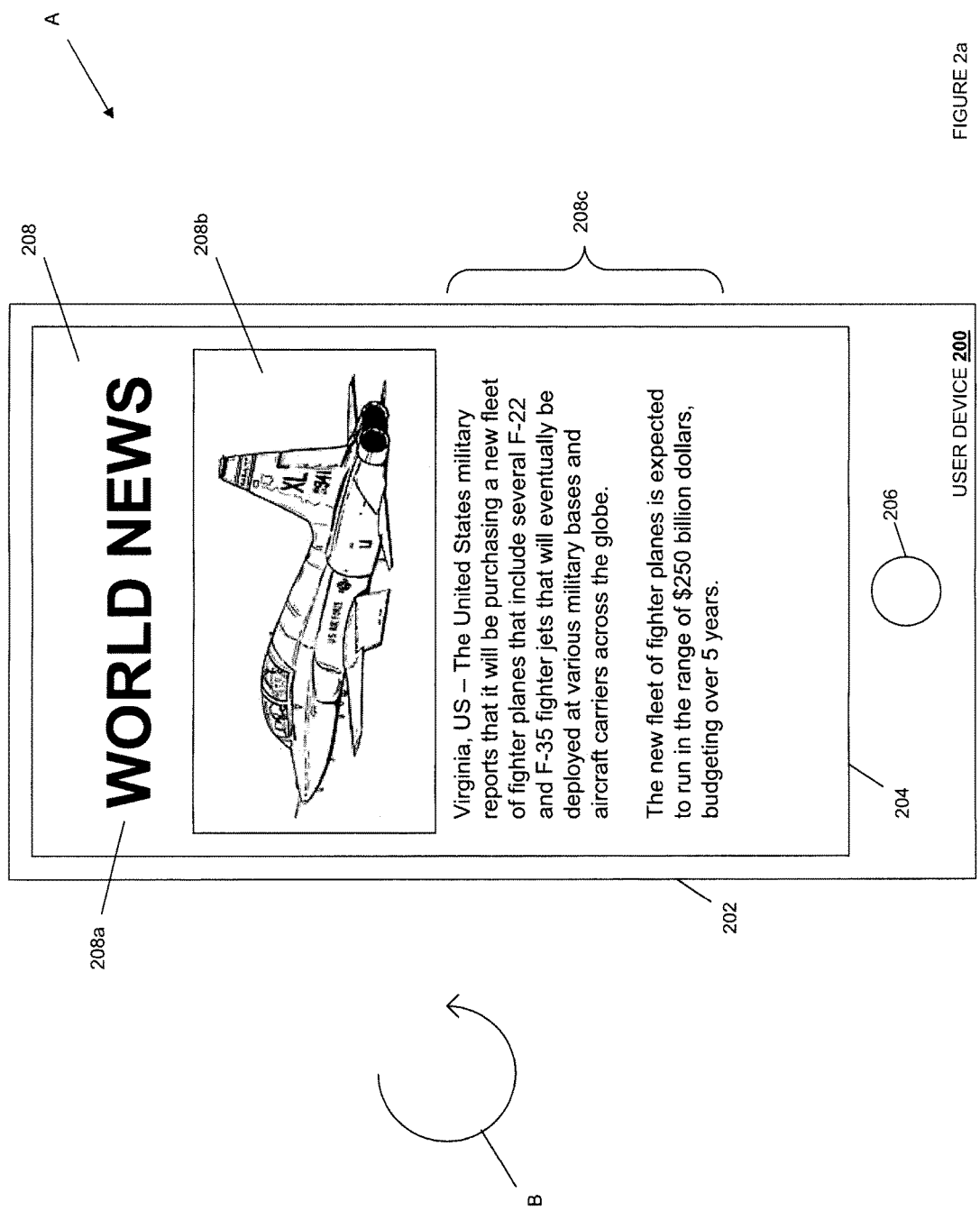
FIG. 2a is a front view illustrating an embodiment of a user device displaying a plurality of content in a first region display mode.

Referring now to FIGS. 1 and 2a, an embodiment of a method 100 for translating content is illustrated. While several embodiments of the method 100 are illustrated and described below, those embodiments are not meant to be limiting and one of skill in the art will recognize that a variety of modification to the illustrated embodiments will fall within the scope of the present disclosure. Furthermore, particular aspects of each embodiment may be combined with other embodiments while remaining within the scope of the present disclosure. The method 100 is described with reference to a user device 200 that includes a processing system for processing information, discussed in further detail below. The user device 200 includes a device chassis 202 that houses processing components (not illustrated) that are coupled to a display 204 and an input button 206. The display 204 and input button 206 are accessible on a surface of the device chassis 202. In an embodiment, the display 204 may provide an input device such as, for example, a touch-input display device known in the art. In some embodiments discussed below, the user device is illustrated and described as a mobile user device such as a phone. However, the present disclosure is not so limited, and the user device may include other mobile computing devices such as tablet computers and laptop computers, and/or a variety of other computing devices known in the art.

The method 100 begins at block 102 where content that is associated with a first region display mode is provided on a user device. The content may be provided on the user device 200 using a number of methods known in the art. In an embodiment, prior to the execution of the method 100, the content may have been stored on the user device 200 in a storage device or memory that is housed in the user device 200. For example, the content may be included in an application that was previously copied onto the user device 200. In another embodiment, the content may be retrieved over a network by the user device 200. For example, the content may be a webpage on a website that is accessed using the user device 200 during block 102 of the method 100. In another embodiment, the content may be provided through a user interface on the user device 200. For example, the content may be included in an image captured using a camera on the user device 200, through the display 202 (e.g., when the display is a touch input display device), through a microphone on the user device 200, and/or using a variety of other user interfaces known in the art. While a variety of embodiments of the provision of content on the user device 200 along with examples of those embodiments are provided herein, one of skill in the art will recognize that content may be provided on the user device 202 in a variety of other manners without departing from the scope of the present disclosure.

As described in further detail below, content may be associated with region display modes. In an embodiment, a region display mode may be associated with a geographical region, a plurality of geographical regions, a language, a currency, and/or a variety of other translatable content parameters known in the art. For example, a region display mode may be associated with a region that includes a particular country that speaks a particular language and/or uses a particular currency. In another example, a region display mode may be associated with regions that includes a plurality of countries that share a language (e.g., the United States and England) and/or a currency (e.g., the European Union.) In another example, a region display mode may be associated with a language region or regions where a particular language is spoken. In another example, a region display mode may be associated with a currency region or regions where a particular currency is used. While a plurality of examples of region display modes and display mode parameters have been described, one of skill in the art will recognize that a variety of other region display mode parameters will fall within the scope of the present disclosure.

Referring now to FIGS. 1 and 2a, the method 100 then proceeds to block 104 where the content is displayed on the user device. In the embodiment illustrated in FIG. 2a, the content is displayed on a content screen 208 that includes different portions of the content including a title 208a, an illustration 208b, and an article 208c. In an embodiment, the content displayed on the content screen 208 may have been provided on the user device 200 prior to the method 100 (e.g., it may be part of a news application that was previously downloaded to the user device 200) or may be currently being retrieved over a network by the user device 200 during the method 100 (e.g., it may be a webpage on a website that is currently being accessed by the user device 200.)

The content provided on the user device 200 and displayed on the content screen 208 is associated with a first region display mode. In an embodiment, the association of the first region display mode and the content may be a database association between the content and a set of instructions for displaying the content. For example, the content displayed on the content screen 208 in FIG. 2a includes the title 208a and the article 208c displayed in the English language. The user device 200 may include settings that allow a user to set a first region display mode on the user device 200 to an English language region display mode that results in content provided to the user device 200 being displayed in the English language. In one example, the content provided on the user device 200 in block 102 of the method 100 may be provided in a plurality of different languages and, at block 104, the user device 200 may determine that an English language region display mode has been enabled and, in response, provide the title 208a and the article 208c in the English language. In another example, the content being displayed on the content screen 208 in FIG. 2a may have originally been provided or received only in a language or languages other than the English language, and the user device 200 may determine that the English language region display mode has been enabled and, in response, translate the content to provide the title 208a and the article 208c in the English language. The details involved in the translation of content are described in further detail below with reference to block 110 of the method 100.

However, in other embodiments, the association of the first region display mode and the content may not include any database associations, and instead may refer to the language in which the content was received. For example, the content may have been received as displayed on the content screen 208 in FIG. 2a (including the title 208a and the article 208c displayed in the English language), and the association between the content and a first region display mode may simply refer to fact that the content is available for display on the user device 200 in the English language (i.e., an English language region display mode.) Thus, the user device 200 may receive, or have been previously provided with, content that is provided in the English language, and that content is considered to be associated with an English language region display mode. As such, displaying the content according to the first region display mode at block 104 of the method 100 may simply involve the user device 200 displaying content in response to receiving it or having been provided it (e.g., if the content screen 208 is a webpage that is provided by a website in the English language to all devices that access that website, the user device 200 may display that content screen 208 as provided using conventional methods known in the art in order to display the content according to the first region display mode.)

Figure 2B:
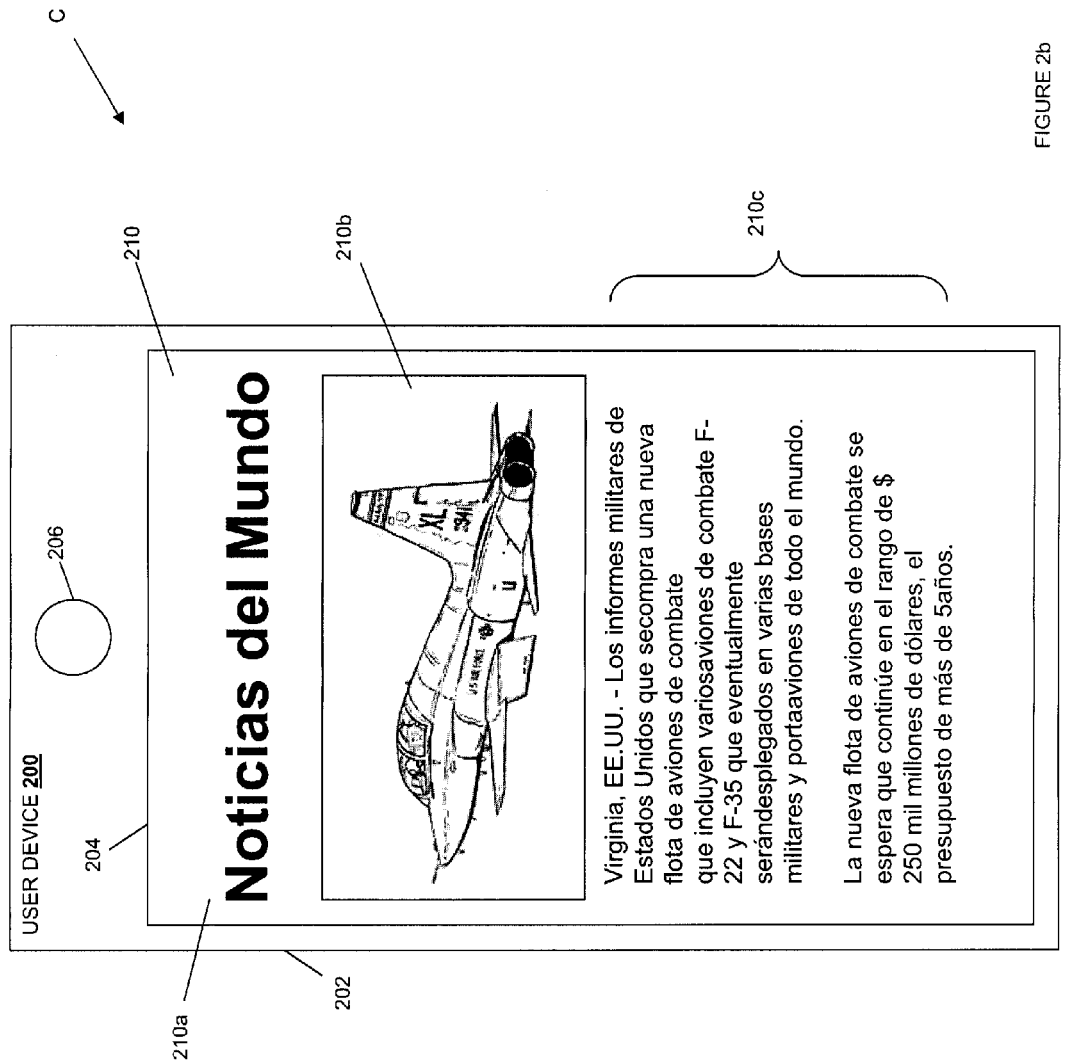
FIG. 2b is a front view illustrating an embodiment of the user device of FIG. 2a moved to a different orientation and, in response, displaying the plurality of content in a second region display mode.

Referring now to FIGS. 1, 2a, and 2b, the method 100 then proceeds to block 106, where a predefined orientation of the user device 200 is detected. In an embodiment, the user device 200 may be provided with a predefined orientation that may be detected by an orientation detection device (e.g., a gyroscope) in the user device 200. Furthermore, the predefined orientation may be set by the user of the user device 200. The user device 200 is illustrated in FIG. 2a in an orientation A. In an embodiment, at block 106 of the method 100, the user may rotate the user device 200 in a direction B to change the orientation of the user device 200 from the orientation A to an orientation C, illustrated in FIG. 2b. In an embodiment, the orientation C may be the predefined orientation, and the orientation detection device may detect that the user device 200 is in the orientation C. In another embodiment, the predefined orientation may include a predefined orientation change, and the orientation detection device may detect the rotation, or change in orientation, of the user device 200 from the orientation A to the orientation C as the predefined orientation. While rotation of the user device 200 about approximately 180 degrees is described in the present disclosure as the predefined orientation due to that orientation change having desirable characteristics such as providing the display 202 with the same aspect ration in both the beginning and ending orientation, the present disclosure is not so limited, and a variety of different orientations and/or orientation changes are envisioned as falling within the scope of the present disclosure. Furthermore, the predefined orientation may include an orientation range such as, for example, between 175 and 185 degrees from the orientation illustrated in FIG. 2a.

The method 100 then proceeds to block 108 where a second region display mode is determined to be associated with the predefined orientation. In an embodiment, in response to detecting the predefined orientation, the user device 200 determines that a second region display mode is associated with the predefined orientation or orientation change provided by the user at block 106. In an embodiment, the user device 200 may include settings that allow the user to set a second region display mode that is associated with the predefined orientation. For example, the user may set the user device 200 to a Spanish language region display mode for use by the user device 200 in response to the detection of the predefined orientation. In another embodiment, the user device 200 may include a location determination device (e.g., a Global Positioning System (GPS)) that the user instructs the user device 200 to use to determine the second region display mode that will be associated with the predefined orientation. For example, the user may set the user device 200 to determine a current location of the user/user device 200 in response to the detection of the predefined orientation, and that current location may be used to determine the second region display mode (e.g., in the illustrated embodiment, a current location may be Mexico City, Mexico, resulting in the second region display mode being a Spanish language region display mode.) In other embodiments, block 108 of the method 100 may be skipped.

The method 100 then proceeds to block 110 where the content is translated according to the second region display mode to produce translated content. In some embodiments, the actual "translation" of the content according to the second region display mode at block 110 (e.g., from a first language to a second language) may have been conducted prior to the method 100. For example, as discussed above, the content may have been previously provided on the user device 100 prior to the method 100 in a variety of different languages, and thus the translation of the content according to the second region display mode may include the user device 200 retrieving the translated content in the language that is associated with second region display mode. In another example, the content may be available in different languages on a device database that is coupled to the user device 200 through a network, and thus the translation of the content according to the second region display mode may include the user device 200 retrieving the translated content over the network from the device database in the language that is associated with second region display mode.

In other embodiments, the user device 200 may include a translation engine that is operable to receive the content in a first language and translate that content to a second language. For example, upon being set to a particular second region display mode, the user device 200 may retrieve and store a second region translation database that allows the user device 200 to produce translated content in a language that is associated with the second region display mode from content that was provided in one or more different languages. In other embodiments, the user device 200 may be coupled over a network to the translation engine that is operable to receive the content in a first language and translate that content to a second language. For example, upon detecting the predefined orientation, the user device 200 may send the content over a network to a device that includes the translation engine for translation, and receive the translated content back.

The method 100 then proceeds to block 112 where the translated content is displayed. FIG. 2b illustrates a translated content screen 210 that include a title 210a and article 210c that have been translated from the English language title 208a and article 208c of the content screen 208 in FIG. 2a to a Spanish language. In an embodiment, the structure of the content screen 208 is maintained in the content screen 210, with the size and positioning of the title 208a, illustration 208b, and article 208c on the content screen 208 the same relative to the size and positioning of the title 210a, illustration 210b, and article 210c on the content screen 210. Thus, as can been seen in FIGS. 2a and 2b, the method 100 allows a user viewing the content screen 208 in the English language on the user device 200 to quickly and easily have that content screen 208 translated to the Spanish language to display the translated content screen 210 by reorienting the user device 200. One application of this illustrated embodiment includes learning applications on the user device 200 that provide words, phrases, and other content on the user device 200 in a number of different languages, and then allow the user to learn a language by viewing the content in their native language following by reorienting the user device 200 to view the content in the language they wish to learn. Another application of this illustrated embodiment includes web browsing on the user device 200 that allows the user to quickly view a webpage in their native language by reorienting the user device 200 such that the webpage is translated from a foreign language in which it was originally provided.

Figure 3B:
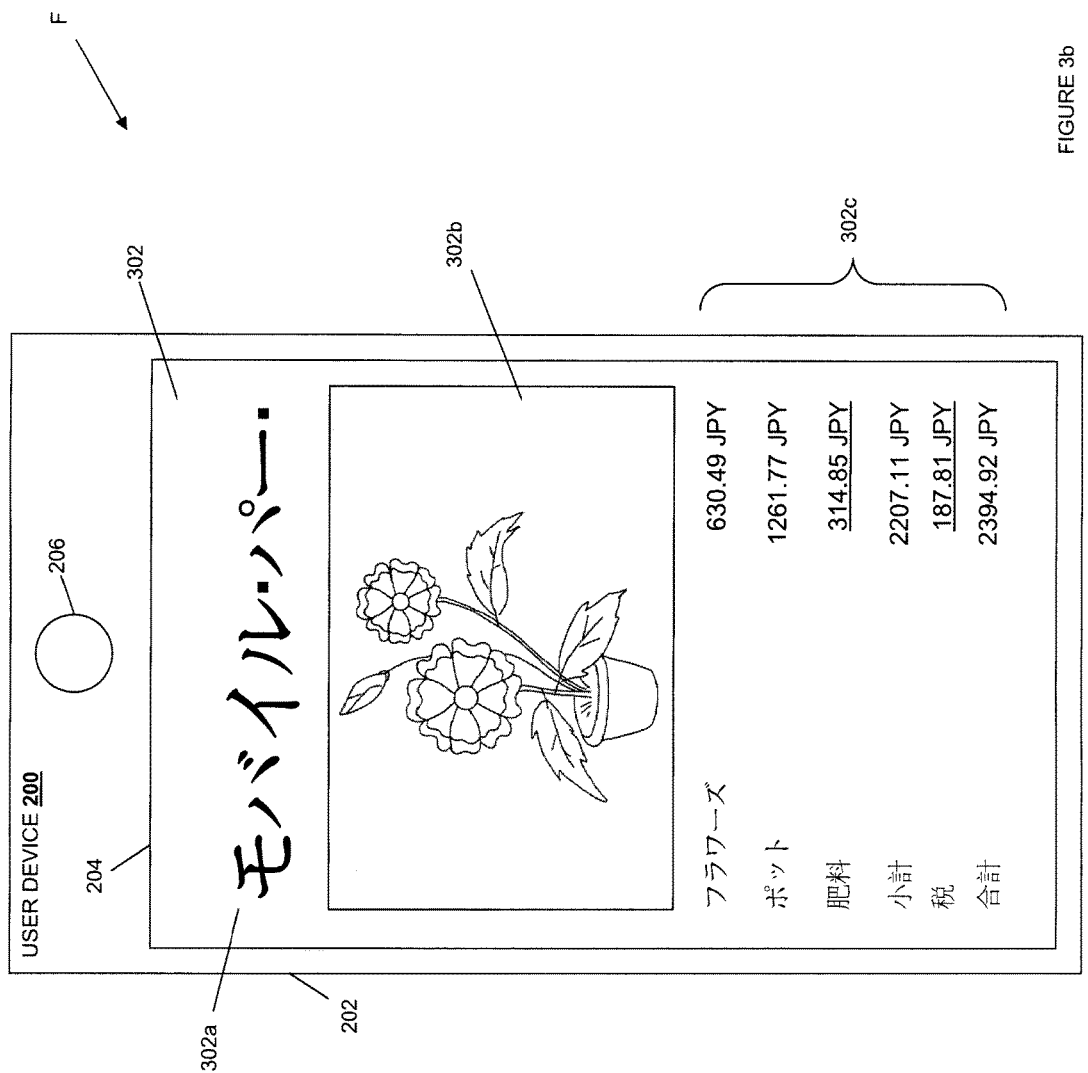
FIG. 3b is a front view illustrating an embodiment of the user device of FIG. 3a moved to a different orientation and, in response, displaying the plurality of content in a second region display mode.

Referring now to FIGS. 1, 3a, and 3b, another embodiment of the method 100 is illustrated that is substantially similar to the method 100 described above with reference to FIGS. 2a and 2b, but with some differences detailed below. At blocks 102 and 104 of the method 100, the content that is associated with the first region display mode has been provided on the user device 200 over a network and displayed on the user device 200 as a mobile payment content screen 300 that includes a title 300a, an image 300b, and payment details 300c. For example, the user of the user device 200 may be shopping in a store and have the ability to purchase goods from a store merchant using their user device 200, and the mobile payment content screen 300 may be provided for them to do so. In another example, the user of the user device 200 may be shopping online and may be provided the mobile payment content screen 300 to make a purchase.

The method 100 then proceeds to block 106 as discussed above, where the user reorients the user device 200 from an orientation D, illustrated in FIG. 3a, by rotating the user device 200 in a direction E until the user device 200 is in an orientation F, illustrated in FIG. 3b. As discussed above, the orientation F may be a predefined orientation that is detected by an orientation detection device in the user device 200 at block 106 of the method 100.

At block 108 of the method 100, in response to detecting the predefined orientation, the user device 200 determines that a second region display mode is associated with the predefined orientation or orientation change provided by the user at block 106. As discussed above, the user device 200 may include settings that allow the user to set a second region display mode that is associated with the predefined orientation. For example, the user may set the user device 200 to a Japanese language region display mode and a Japanese currency region display mode for use in response to the detection of the predefined orientation. As also discussed above, the user device 200 may include a location determination device (e.g., a Global Positioning System (GPS)) that the user instructs the user device 200 to use to determine the second region display mode that will be associated with the predefined orientation. For example, the user may set the user device 200 to determine a current location of the user/user device 200 in response to the detection of the predefined orientation, and that current location may be used to determine the second region display mode (e.g., in the illustrated embodiment, a current location may be Tokyo, Japan, resulting in the second region display mode being a Japanese language region display mode and a Japanese currency region display mode.)

At block 110 of the method 100, the content is translated according to the second region display mode to produce translated content. As discussed above, the actual "translation" of the content according to the second region display mode at block 110 may have been conducted prior to the method 100. For example, the content may have been previously provided on the user device 100 in a variety of different languages and currencies, and thus the translation of the content according to the second region display mode may include the user device 200 retrieving the translated content in the language an currency that is associated with second region display mode. In another example, the content may be available in different languages and currencies on a device database that is coupled to the user device 200 through a network, and thus the translation of the content according to the second region display mode may include the user device 200 retrieving the translated content over the network from the device database in the language and currency that is associated with second region display mode.

As also discussed above, the user device 200 may include a translation engine that is operable to receive the content in a first language and first currency and translate that content to a second language and second currency. For example, upon being set to a particular second region display mode, the user device 200 may retrieve and store a second region translation database that allows the user device 200 to produce translated content in a language and currency that is associated with the second region display mode from content that was provided in one or more different languages and/or currencies. In other embodiments, the user device 200 may be coupled over a network to the translation engine that is operable to receive the content in a first language and first currency and translate that content to a second language and second currency. For example, upon detecting the predefined orientation, the user device 200 may send the content over a network to a device that includes the translation engine for translation, and receive the translated content back.

At block 112 of the method 100, the translated content is displayed. FIG. 3b illustrates a translated content screen 302 that include a title 302a and payment details 302c that have been translated from the English language title 300a and the English language and United States dollar currency payment details 300c of the content screen 300 in FIG. 3a to a Japanese language and Japanese Yen currency. In an embodiment, the structure of the content screen 300 is maintained in the content screen 302, with the size and positioning of the title 300a, illustration 300b, and article 300c on the content screen 300 the same relative to the size and positioning of the title 302a, illustration 302b, and payment details 302c on the content screen 302. Thus, as can been seen in FIGS. 3a and 3b, the method 100 allows a user viewing the content screen 300 in the English language and United States dollar currency on the user device 200 to quickly and easily have that content screen 300 translated to the Japanese language and Japanese Yen currency to display the translated content screen 302 by reorienting the user device 200. One application of this illustrated embodiment includes mobile payment or online shopping applications on the user device 200 that provide purchase details associated with a purchase in a foreign language and currency, and then allow the user to view those purchase details in their native language and currency by reorienting the user device 200.

Figure 4A:
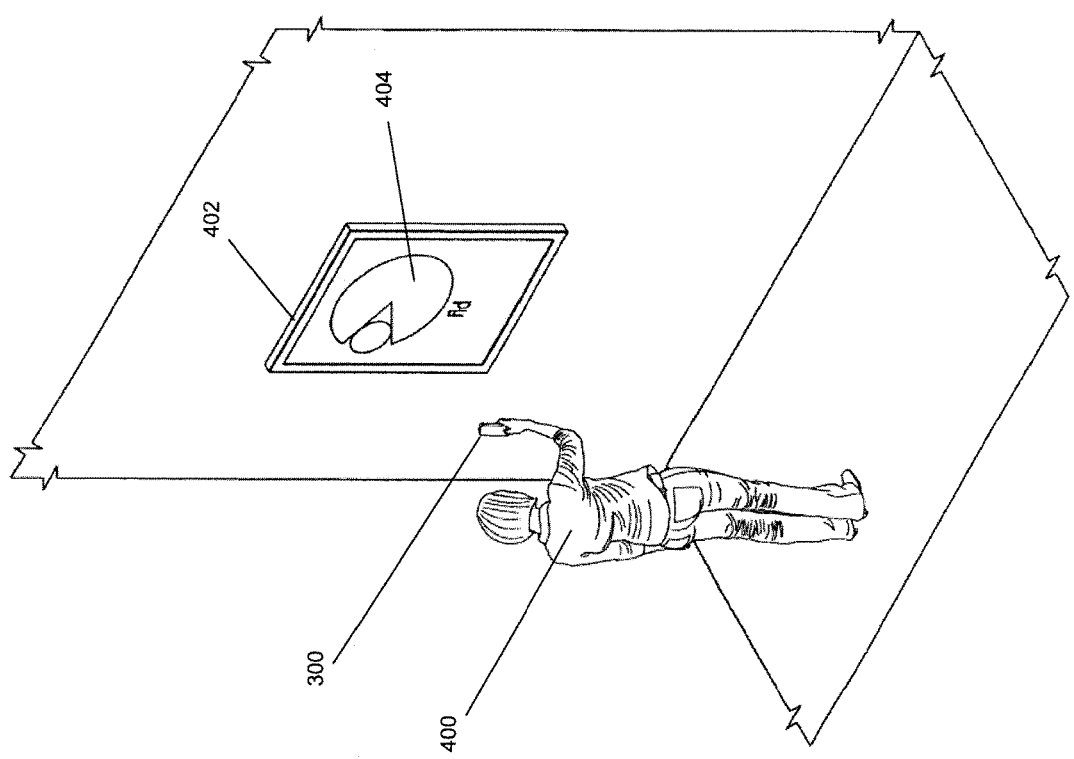
FIG. 4a is a perspective view illustrating a user providing a plurality of content to a user device through a user interface.

Referring now to FIGS. 1, 4a, 4b, and 4c, another embodiment of the method 100 is illustrated that is substantially similar to the method 100 described above with reference to FIGS. 2a and 2b but with some differences detailed below. At block 102 of the method 100, the content is provided on the user device 200 via a user interface that, in the illustrated embodiment, includes a camera on the user device 200. FIG. 4a illustrates a user 400 holding the user device 200 to capture an image of an advertisement 402 that includes content 404. For example, the user of the user device 200 may be traveling in a region in which the user is unfamiliar with the language, and that user may see an advertisement or other information and capture an image of it.

At block 104 of the method 100, the image including the content 404, which is associated with a first region display mode as discussed above, is provided on the user device 200 as an image content screen 406 that includes an graphic 406a and text details 406b. In an embodiment, the user device 200 may user techniques known in the art such as, for example, character recognition techniques, in order to determine that the image includes the graphic 406a and the text details 406b and to display those portions of the content screen 406. In another embodiment, the determination that the image includes at least the text details 406b may occur later in the method 100 (e.g., during the translation at block 110), and the display of the content screen 406 may only include displaying the image as captured by the user in block 102.

Figure 4B:
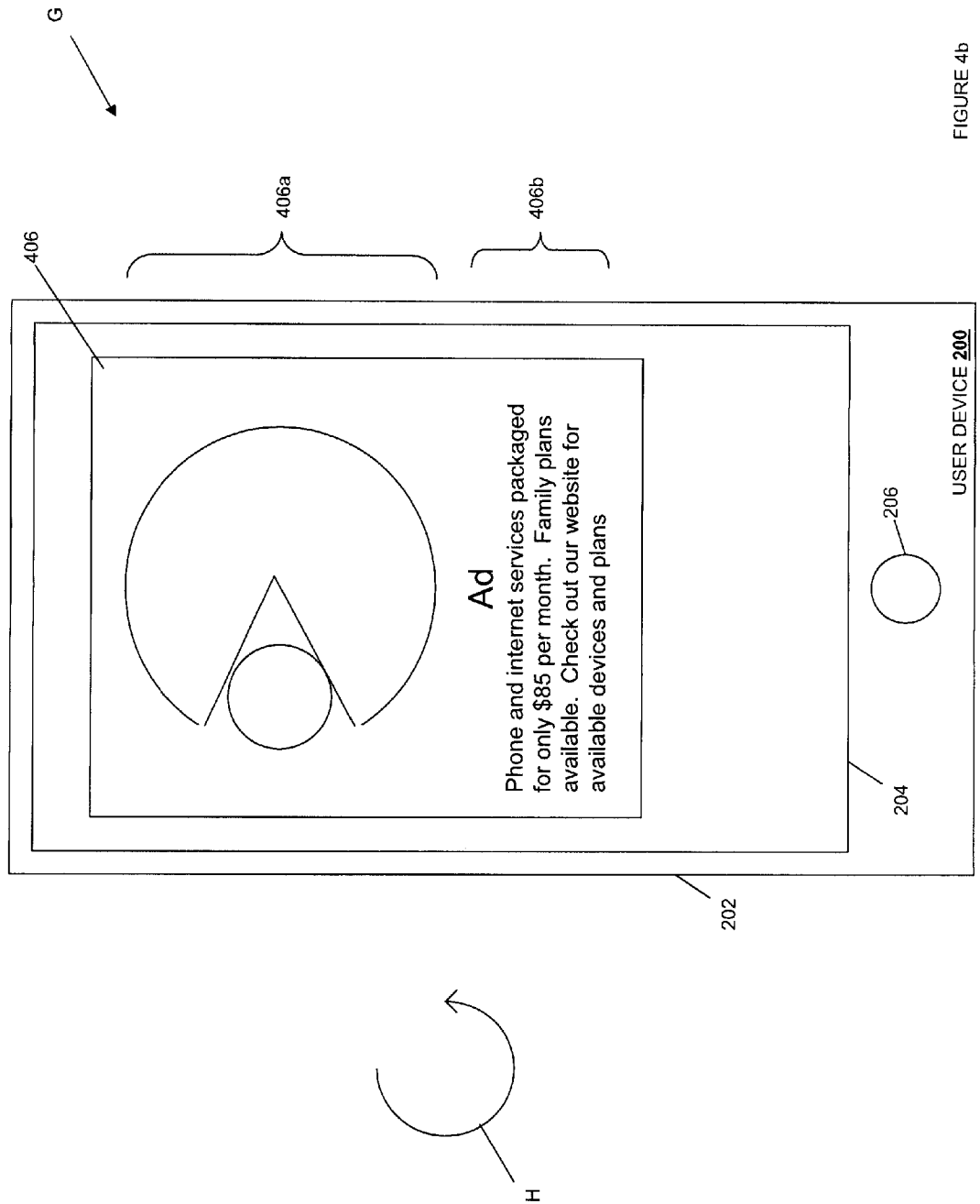
FIG. 4b is a front view illustrating an embodiment of the user device of FIG. 4a displaying the plurality of content in a first region display mode.

The method 100 then proceeds to block 106 as discussed above, where the user reorients the user device 200 from an orientation G, illustrated in FIG. 4b, by rotating the user device 200 in a direction H until the user device 200 is in an orientation I, illustrated in FIG. 3b. As discussed above, the orientation I may be a predefined orientation that is detected by an orientation detection device in the user device 200 at block 106 of the method 100.

At block 108 of the method 100, in response to detecting the predefined orientation, the user device 200 determines that a second region display mode is associated with the predefined orientation or orientation change provided by the user at block 106. As discussed above, the user device 200 may include settings that allow the user to set a second region display mode that is associated with the predefined orientation. For example, the user may set the user device 200 to a German language region display mode and a German currency region display mode for use in response to the detection of the predefined orientation. As also discussed above, the user device 200 may include a location determination device (e.g., a Global Positioning System (GPS)) that the user instructs the user device 200 to use to determine the second region display mode that will be associated with the predefined orientation. For example, the user may set the user device 200 to determine a current location of the user/user device 200 in response to the detection of the predefined orientation, and that current location may be used to determine the second region display mode (e.g., in the illustrated embodiment, a current location may be Munich, Germany, resulting in the second region display mode being a German language region display mode and German currency region display mode.)

At block 110 of the method 100, the content is translated according to the second region display mode to produce translated content. As discussed above, the user device 200 may use techniques known in the art such as, for example, character recognition techniques, to determine that the image captured by the user in block 102 includes the text details 406b in the content screen 406. By recognizing the characters in the text details 406a of the content screen 406, the user device may then perform a translation operation on the text details according to the second region display mode.

As discussed above, the user device 200 may include a translation engine that is operable to receive the content in a first language and first currency and translate that content to a second language and second currency. For example, upon being set to a particular second region display mode, the user device 200 may retrieve and store a second region translation database that allows the user device 200 to produce translated content in a language that is associated with the second region display mode from content that was provided in one or more different languages and one or more different currencies. In other embodiments, the user device 200 may be coupled over a network to the translation engine that is operable to receive the content in a first language and first currency and translate that content to a second language and second currency. For example, upon detecting the predefined orientation, the user device 200 may send the content over a network to a device that includes the translation engine for translation, and receive the translated content back.

At block 112 of the method 100, the translated content is displayed. FIG. 4c illustrates a translated content screen 408 that include text details 408b that have been translated from the English language and United States Dollar currency text details 406b of the content screen 406 in FIG. 4b to a German language and German Euro currency. In an embodiment, the structure of the content screen 406 is maintained in the content screen 408, with the size and positioning of the graphic 406a and text details 406b on the content screen 406 the same relative to the size and positioning of the graphic 408a and text details 408b on the content screen 408. Thus, as can been seen in FIGS. 4a, 4b, and 4c, the method 100 allows a user presented with a physical advertisement in the English language and United States dollar currency to capture an image of that physical advertisement on the user device 200, and then quickly and easily have the details of that physical advertisement translated to the German language and German Euro currency to display the translated content screen 408 by reorienting the user device 200. One application of this illustrated embodiment includes a mobile application on the user device 200 for a user that is traveling in a foreign country and that allows the user to capture images of advertisements or other information that include text in a foreign language in order to quickly and easily translate that text to the user native language so that the user may understand that advertisement or other information.

Figure 5A:
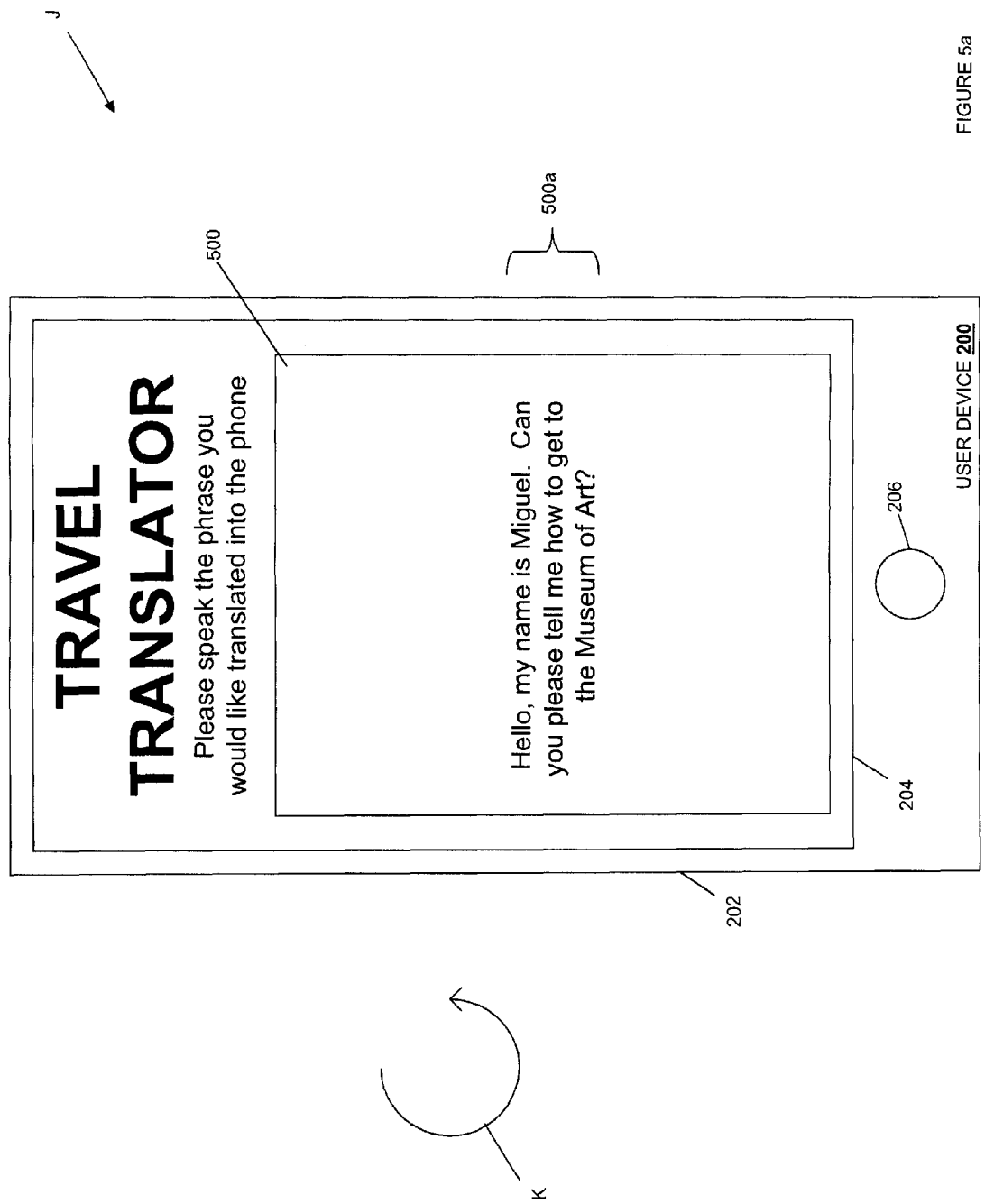
FIG. 5a is a front view illustrating an embodiment of a user device displaying a plurality of content received from a user in a first region display mode.
Figure 5B:
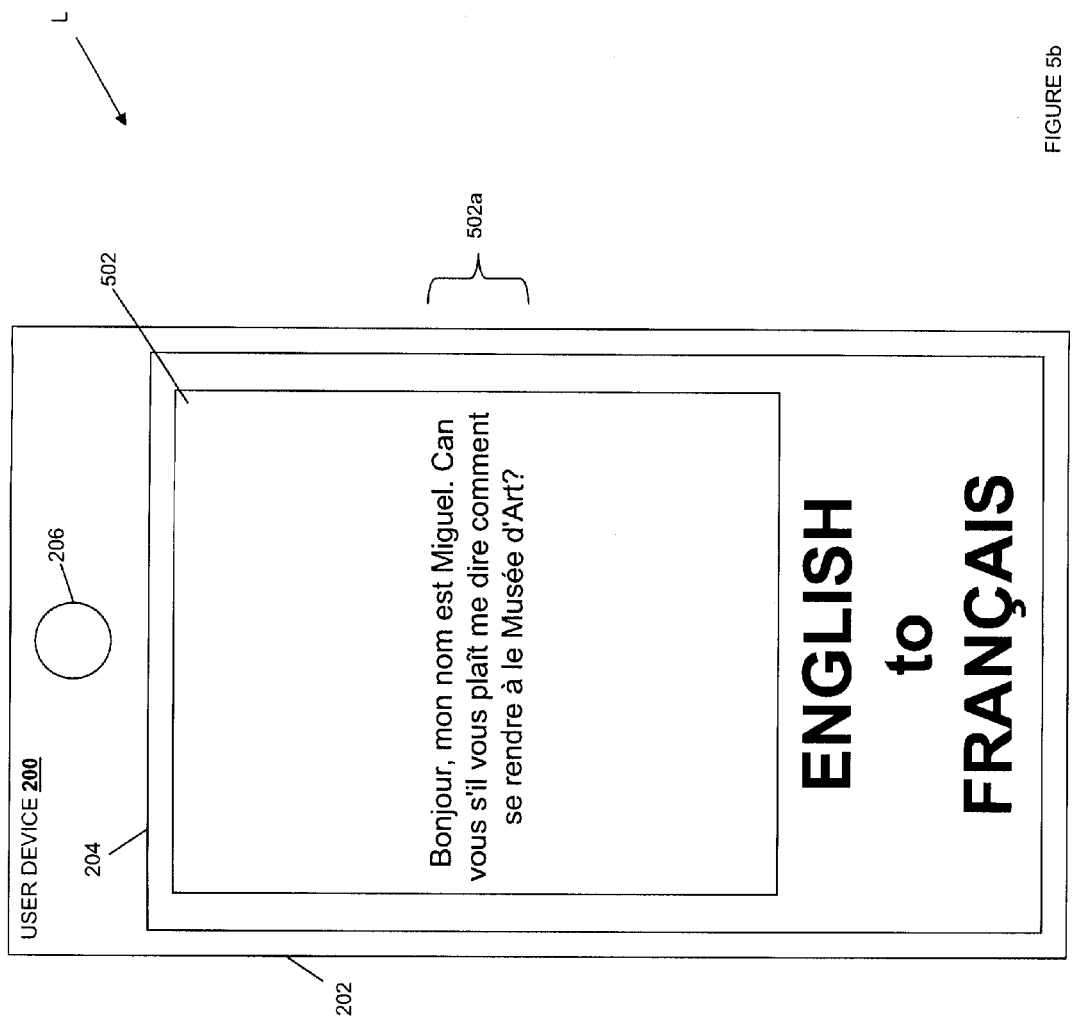
FIG. 5b is a front view illustrating an embodiment of the user device of FIG. 5a moved to a different orientation and, in response, displaying the plurality of content in a second region display mode.

Referring now to FIGS. 1, 5a, and 5b, another embodiment of the method 100 is illustrated that is substantially similar to the method 100 described above with reference to FIGS. 2a and 2b but with some differences detailed below. At block 102 of the method 100, the content is provided on the user device 200 via a user interface that, in the illustrated embodiment, includes a keyboard or a microphone on the user device 200. FIG. 5a illustrates the user device 200 subsequent to a user have either typed or spoken the phrase "Hello, my name is Miguel. Can you please tell me how to get to the Museum of Art" using a keyboard (e.g., a virtual keyboard on the display 204) or microphone on the user device 200. In an embodiment, the user device 200 is operable to use techniques known in the art such as, for example, voice recognition techniques, to receive a spoken phrase from the microphone on the user device 200 and determine a text string corresponding to that spoken phrase. One example of the embodiment illustrated in FIGS. 5a and 5b may include a user of the user device 200 traveling in a region in which the user is unfamiliar with the language, and that user may need to communicate with a person who does not speak their native language.

At block 104 of the method 100, the text string corresponding to the typed or spoken phrase provided in block 102, which is associated with a first region display mode as discussed above, may be provided on the user device 200 as a content screen 500 that includes the text string 500a. The method 100 then proceeds to block 106 as discussed above, where the user reorients the user device 200 from an orientation J, illustrated in FIG. 5a, by rotating the user device 200 in a direction K until the user device 200 is in an orientation L, illustrated in FIG. 5b. As discussed above, the orientation L may be a predefined orientation that is detected by an orientation detection device in the user device 200 at block 106 of the method 100.

At block 108 of the method 100, in response to detecting the predefined orientation, the user device 200 determines that a second region display mode is associated with the predefined orientation or orientation change provided by the user at block 106. As discussed above, the user device 200 may include settings that allow the user to set a second region display mode that is associated with the predefined orientation. For example, the user may set the user device 200 to a French language region display mode for use in response to the detection of the predefined orientation. As also discussed above, the user device 200 may include a location determination device (e.g., a Global Positioning System (GPS)) that the user instructs the user device 200 to use to determine the second region display mode that will be associated with the predefined orientation. For example, the user may set the user device 200 to determine a current location of the user/user device 200 in response to the detection of the predefined orientation, and that current location may be used to determine the second region display mode (e.g., in the illustrated embodiment, a current location may be Paris, France, resulting in the second region display mode being a French language region display mode.)

At block 110 of the method 100, the content is translated according to the second region display mode to produce translated content. As discussed above, the user device 200 may use techniques known in the art such as, for example, voice recognition techniques, to determine that the spoken phrase provided by the user in block 102 includes the text string 500a in the content screen 500. The user device may then perform a translation operation on the text string 500a (either as provided by the user through a keyboard or determined by the user device using voice recognition techniques) according to the second region display mode.

As discussed above, the user device 200 may include a translation engine that is operable to receive the content in a first language and translate that content to a second language. For example, upon being set to a particular second region display mode, the user device 200 may retrieve and store a second region translation database that allows the user device 200 to produce translated content in a language that is associated with the second region display mode from content that was provided in one or more different languages. In other embodiments, the user device 200 may be coupled over a network to the translation engine that is operable to receive the content in a first language and translate that content to a second language. For example, upon detecting the predefined orientation, the user device 200 may send the content over a network to a device that includes the translation engine for translation, and receive the translated content back.

At block 112 of the method 100, the translated content is displayed. FIG. 5b illustrates a translated content screen 502 that include a text string 502a that has been translated from the English language text string 500a of the content screen 500 in FIG. 5a to a French language. In an embodiment, the structure of the content screen 500 is maintained in the content screen 502, with the size and positioning of the content screen 500 and text string 500a the same relative to the size and positioning of the content screen 502 and text string 502a. In an embodiment, the user device 200 may provide an audible version of the translated text string 502a (e.g., the user may speak an English phase that is used to provide the text string 500a, and the user device 200 may translate that text string 500a to a text string 502a that is in a French language while also producing an audible reading of the text string 502a from a speaker on the user device 200.) Thus, as can been seen in FIGS. 5a and 5b, the method 100 allows a user to quickly type or speak a phrase in their native language into the user device 200 and have that phrase translated to a foreign language and, in some embodiments, audibly provided through a speaker in a foreign language by reorienting the user device 200. One application of this illustrated embodiment includes a mobile application on the user device 200 for a user that is traveling in a foreign country and that allows the user to communicate with foreign speaking people in the foreign country by either typing or speaking phrases in their native language into the user device 200 and then reorienting the user device 200 to show the translated content (or have the translated content produced in an audible form) to the foreign speaking person.

Figure 6A:
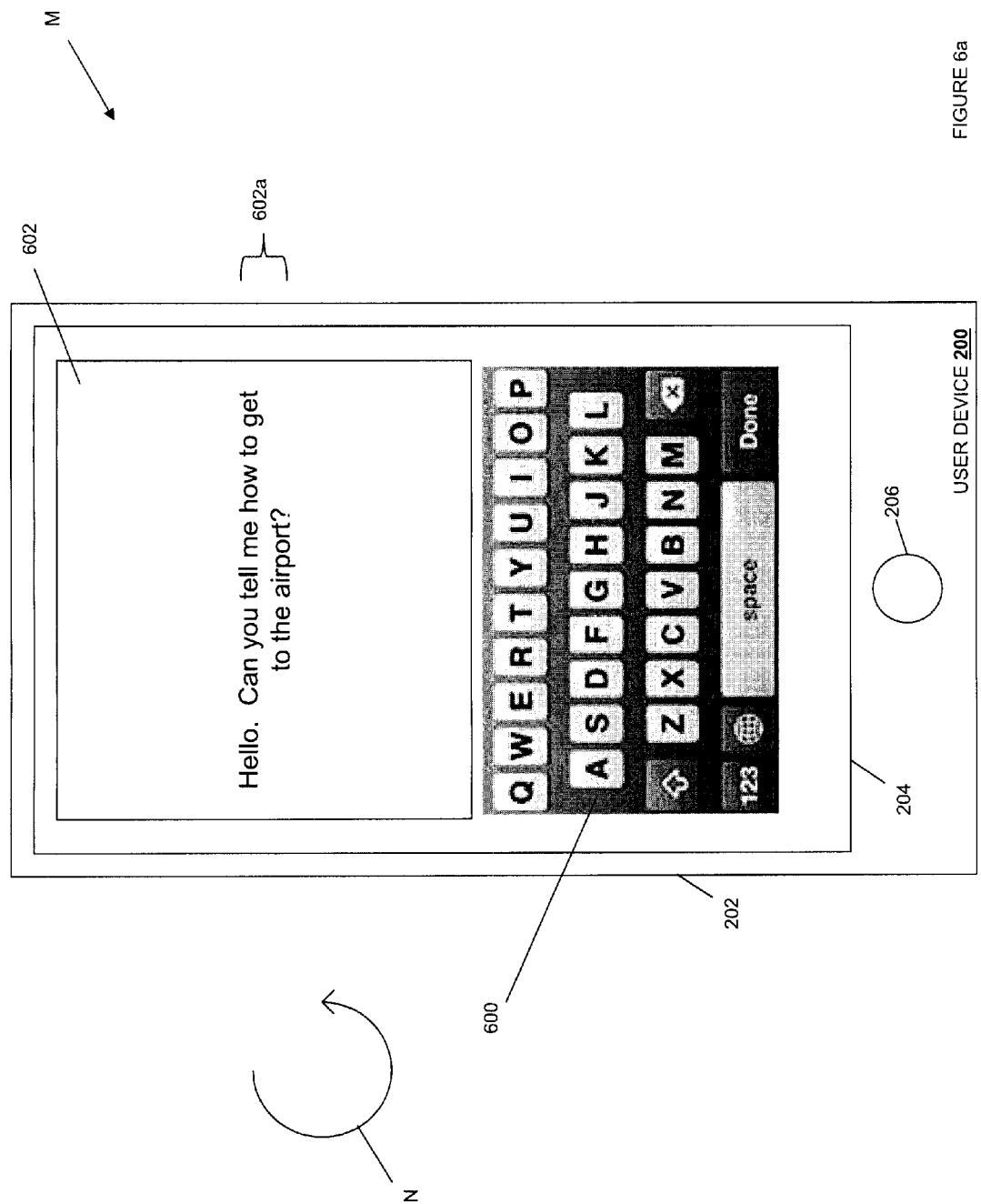
FIG. 6a is a front view illustrating an embodiment of a user device displaying a plurality of content in a first region display mode.
Figure 6B:
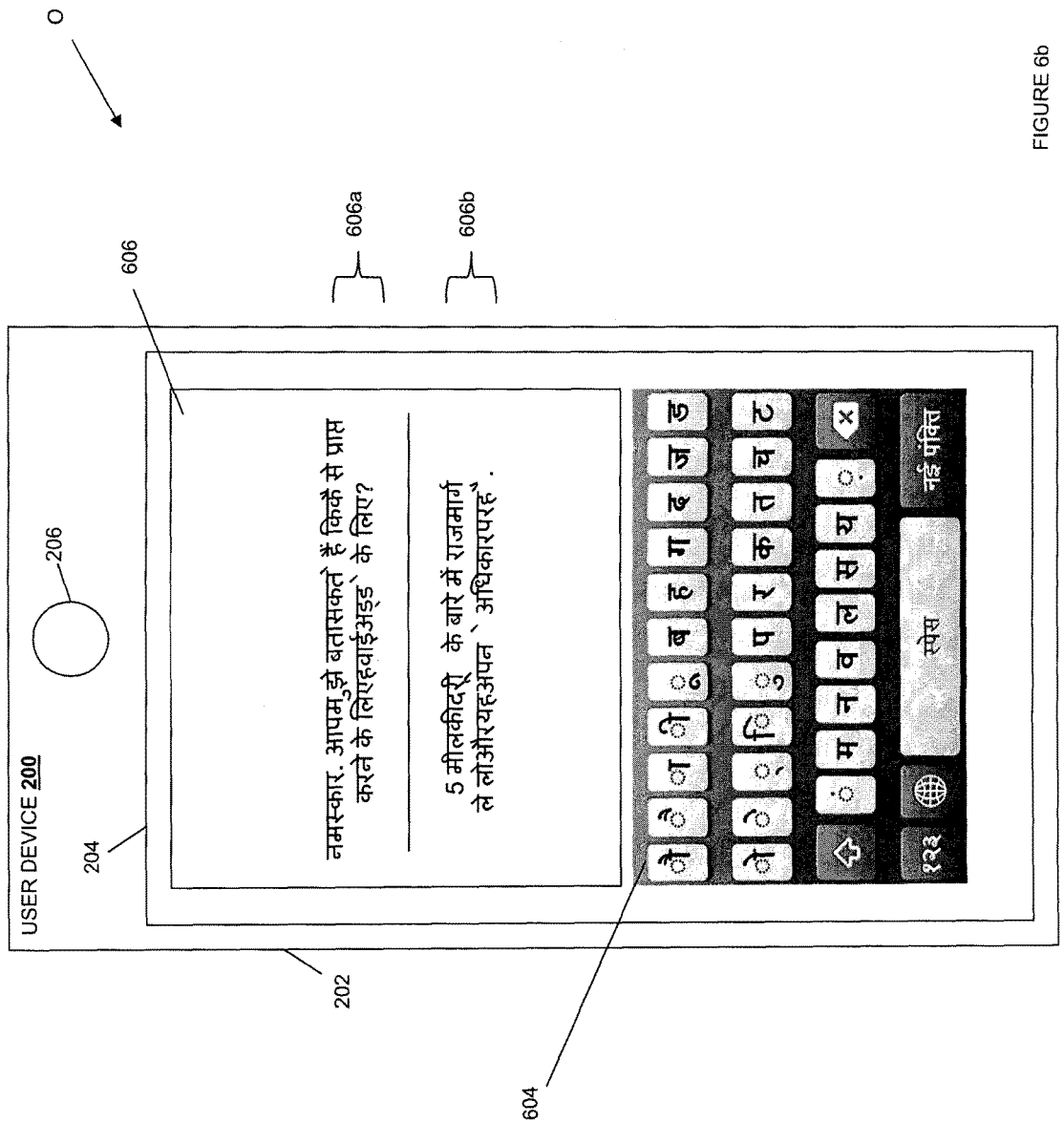
FIG. 6b is a front view illustrating an embodiment of the user device of FIG. 6a moved to a different orientation and, in response, displaying the plurality of content in a second region display mode.

Referring now to FIGS. 1, 6a, and 6b, another embodiment of the method 100 is illustrated that is substantially similar to the method 100 described above with reference to FIGS. 2a and 2b but with some differences detailed below. At block 102 of the method 100, the content is provided on the user device 200 via a user interface that, in the illustrated embodiment, includes a virtual keyboard on the user device 200. FIG. 5a illustrates the user device 200 including an English Language virtual keyboard 600 that a user has used to type the text string "Hello. Can you tell me how to get to the airport?" One example of the embodiment illustrated in FIGS. 6a and 6b may include a user of the user device 200 traveling in a region in which the user is unfamiliar with the language, and that user may need to communicate with a person who does not speak their native language.

At block 104 of the method 100, the text string corresponding to the typed or spoken phrase provided in block 102, which is associated with a first region display mode as discussed above, is provided on the user device 200 as a content screen 602 that includes the text string 602a. The method 100 then proceeds to block 106 as discussed above, where the user reorients the user device 200 from an orientation M, illustrated in FIG. 6a, by rotating the user device 200 in a direction N until the user device 200 is in an orientation O, illustrated in FIG. 6b. As discussed above, the orientation O may be a predefined orientation that is detected by an orientation detection device in the user device 200 at block 106 of the method 100.

At block 108 of the method 100, in response to detecting the predefined orientation, the user device 200 determines that a second region display mode is associated with the predefined orientation or orientation change provided by the user at block 106. As discussed above, the user device 200 may include settings that allow the user to set a second region display mode that is associated with the predefined orientation. For example, the user may set the user device 200 to a Hindi language region display mode for use in response to the detection of the predefined orientation. As also discussed above, the user device 200 may include a location determination device (e.g., a Global Positioning System (GPS)) that the user instructs the user device 200 to use to determine the second region display mode that will be associated with the predefined orientation. For example, the user may set the user device 200 to determine a current location of the user/user device 200 in response to the detection of the predefined orientation, and that current location may be used to determine the second region display mode (e.g., in the illustrated embodiment, a current location may be Hyderabad, India, resulting in the second region display mode being a Hindi language region display mode.)

At block 110 of the method 100, the content is translated according to the second region display mode to produce translated content. The user device 200 may include a plurality of virtual keyboards associated with different languages and/or may retrieve virtual keyboards associated with particular region display modes in response to the user device 200 being set to that region display mode. At block 110, the user device 200 may retrieve a Hindi language keyboard 604. The user device 200 may then perform a translation operation on the text string 602a according to the second region display mode.

As discussed above, the user device 200 may include a translation engine that is operable to receive the content in a first language and translate that content to a second language. For example, upon being set to a particular second region display mode, the user device 200 may retrieve and store a second region translation database that allows the user device 200 to produce translated content in a language that is associated with the second region display mode from content that was provided in one or more different languages. In other embodiments, the user device 200 may be coupled over a network to the translation engine that is operable to receive the content in a first language and translate that content to a second language. For example, upon detecting the predefined orientation, the user device 200 may send the content over a network to a device that includes the translation engine for translation, and receive the translated content back.

At block 112 of the method 100, the translated content is displayed. FIG. 6b illustrates a translated content screen 606 that include a text string 606a that has been translated from the English language text string 602a of the content screen 602 in FIG. 6a to a Hindi language, along with the Hindi language keyboard 604. In an embodiment, the structure of the content screen 602 and the English language keyboard 600 is maintained in the content screen 606, with the size and positioning of the English language keyboard 600 and content screen 602 the same relative to the size and positioning of the Hindi language keyboard 604 and content screen 606. FIG. 6b illustrates the content screen 606 with a second text string 606b that has been added to the content screen 606 by a second user using the Hindi language keyboard 604. Thus, as can been seen in FIGS. 6a and 6b, the method 100 allows a user to quickly type a phrase in their native language into the user device 200 and have that phrase translated to a foreign language upon the reorientation of the user device 200. The user may then hand the user device 200 to a second user, who is presented with the translated phrase and a keyboard that is set to their native language so that they can reply (e.g., as illustrated with the second text string 606b.) One of skill in the art will recognize tat this embodiment allows a conversation to be conducted between two users who speak different languages by simply reorienting the user device appropriately such that that conversation and keyboard are provided in the native language of the user currently communicating. One application of this illustrated embodiment includes a mobile application on the user device 200 for a first user that is traveling in a foreign country and that allows the first user to communicate with a foreign speaking user in the foreign country by passing the user device back and forth with the foreign speaking user.

Thus, a system and method for translating content is provided that allows a user to quickly and easily translate content provided to a user device by reorienting the user device to a predefined orientation. Translating content from a first region display mode to a second region display mode in response to reorientation of the user device provides an easy and intuitive method for using the user device to allow a user to understand content that is provided to them in a foreign language and/or to communicate with others in a foreign country.

As discussed above, while the examples provided have been directed to the translation of languages and currency, the device orientation based translation system is not limited to only these embodiments. One of skill in the art will recognize that a variety of orientation based changes will fall within the scope of the present disclosure. In an embodiment, a content screen may be modified upon reorientation of a user device to include color schemes, images, a reading direction, etc. that may be based on the detected location of the user device. For example, detection of a user device in a particular location associated with a college may cause the content screen to be modified with the school colors for that college. In another example, detection of a user device in a particular location associated with a relatively conservative population may cause the content screen to replace images of people in bathing suits with images of people that full clothed. In another example, text in a left-to-right reading format on a content screen may be reoriented to be read from right-to-left, or from top-to-bottom, when the user device is detected in a location where that is the norm.

Furthermore, the region display modes may be associated with gaming applications and may utilize the orientation of the user device to display different content screens. For example, a first region display mode may be associated with a beginning level difficulty of a gaming application, while a second region display mode may be associated with an expert level difficulty of the gaming application, and the user may reorient the user device to switch between those two difficulty levels quickly and easily. In another example, a second region display mode in a gaming application may provide hidden content in the gaming application such that a user may be playing the game as normal in the first region display mode and reorient the user device to switch to the second region display mode to reveal hidden content that was not visible in the normal/first region display mode (i.e., the game may operate normally in both the first and second region display mode, but with the hidden content only reveals upon reorientation of the user device.) In another example or combined with one of the examples above, a user may be required to reorient the user device to switch to the second region display mode in order to complete a level in the gaming application.

Figure 7:
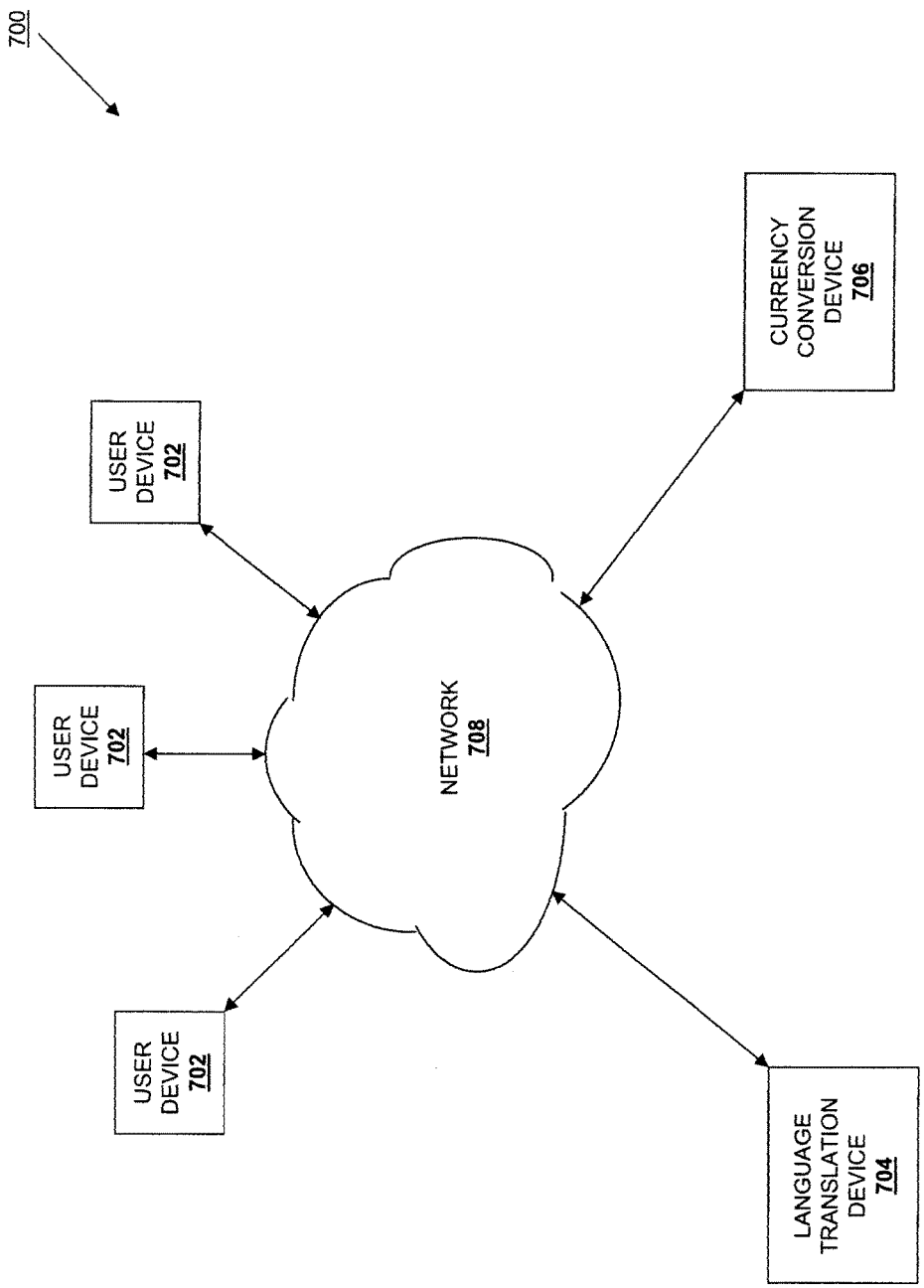
FIG. 7 is a schematic view illustrating an embodiment of a networked system.

Referring now to FIG. 7, an embodiment of a networked system 700 that may be used in the content translation system described above is illustrated. The networked system 700 may include includes a plurality of user devices 702, a language translation device 704, and a currency conversion device 706 in communication over a network 708. Any of the user devices 702 may be the user device 200, discussed above. The language translation device 704 may be the language translation devices discussed in the some of the embodiments detailed above in which the translations of content are performed external to the user device 200. The currency conversion device 706 may be the currency conversion device discussed in some of the embodiments detailed above in which currencies are translated/converted external to the user device 200.

The user device 702, language translation device 704, and/or currency conversion device 706 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 700, and/or accessible over the network 708.

The network 708 may be implemented as a single network or a combination of multiple networks. For example, in various embodiments, the network 708 may include the Internet and/or one or more intranets, landline networks, wireless networks, and/or other appropriate types of networks.

The user devices 702 may be implemented using any appropriate combination of hardware and/or software configured for wired and/or wireless communication over network 708. For example, in one embodiment, the user devices 702 may be implemented as a personal computer of a user in communication with the Internet. In other embodiments, the user devices 702 may be a smart phone, personal digital assistant (PDA), laptop computer, and/or other types of computing devices.

The user devices 702 may include one or more browser applications which may be used, for example, to provide a convenient interface to permit the user to browse information available over the network 708. For example, in one embodiment, the browser application may be implemented as a web browser configured to view information available over the Internet.

The user devices 702 may also include one or more toolbar applications which may be used, for example, to provide user-side processing for performing desired tasks in response to operations selected by the user. In one embodiment, the toolbar application may display a user interface in connection with the browser application.

The user devices 702 may further include other applications as may be desired in particular embodiments to provide desired features to the user devices 702. In particular, the other applications may include a payment application for payments assisted by a payment service provider. The other applications may also include security applications for implementing user-side security features, programmatic user applications for interfacing with appropriate application programming interfaces (APIs) over the network 708, or other types of applications. Email and/or text applications may also be included, which allow the user to send and receive emails and/or text messages through the network 708. The user devices 702 include one or more user and/or device identifiers which may be implemented, for example, as operating system registry entries, cookies associated with the browser application, identifiers associated with hardware of the user devices 702, or other appropriate identifiers, such as a phone number. In one embodiment, the user identifier may be used by a payment service provider device to associate the user with a particular account as further described herein.

The language translation device 704 and/or the currency conversion device 706 may be maintained, for example, by an application developer. In this regard, language translation device 704 and/or the currency conversion device 706 may include databases for translating between a plurality of languages and or converting between a plurality of currencies.

Figure 8:
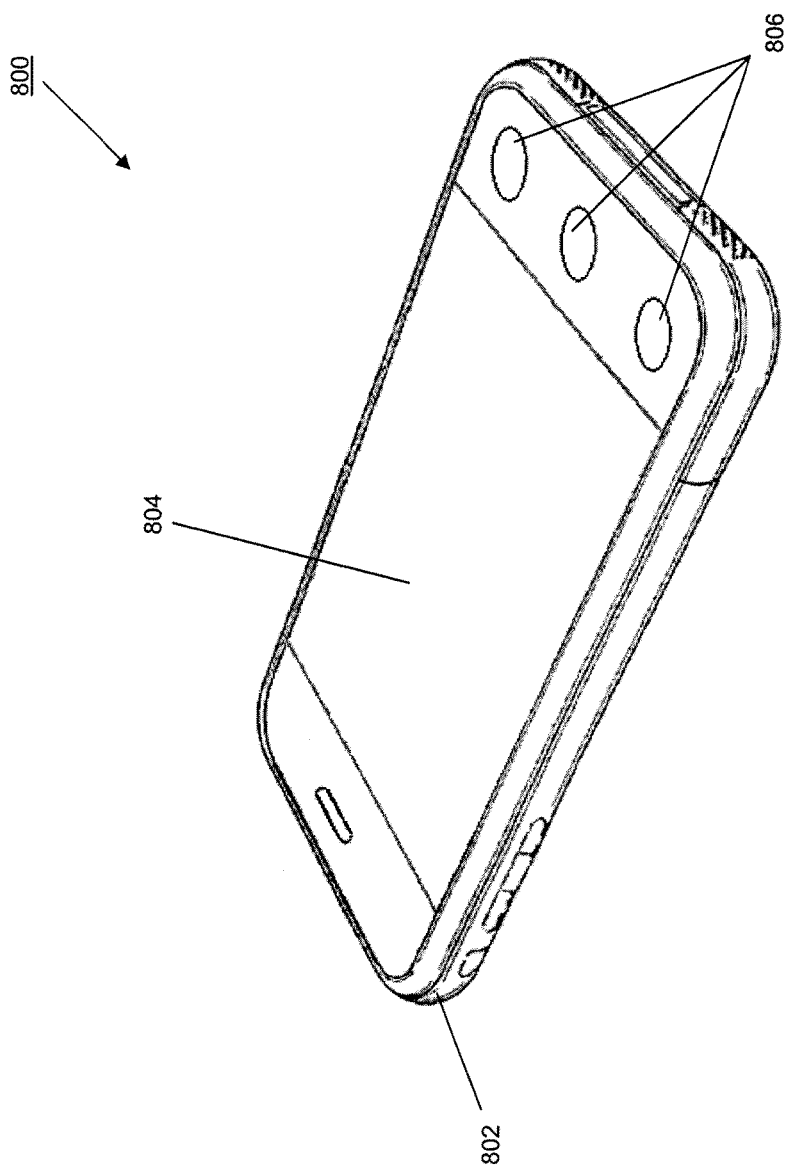
FIG. 8 is a perspective view illustrating an embodiment of a user device.

Referring now to FIG. 8, an embodiment of a user device 800 is illustrated. The user device 800 may be the user devices 200 and/or 702. The user device 800 includes a chassis 802 having a display 804 and an input device including the display 804 and a plurality of input buttons 806. One of skill in the art will recognize that the user device 800 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 9:
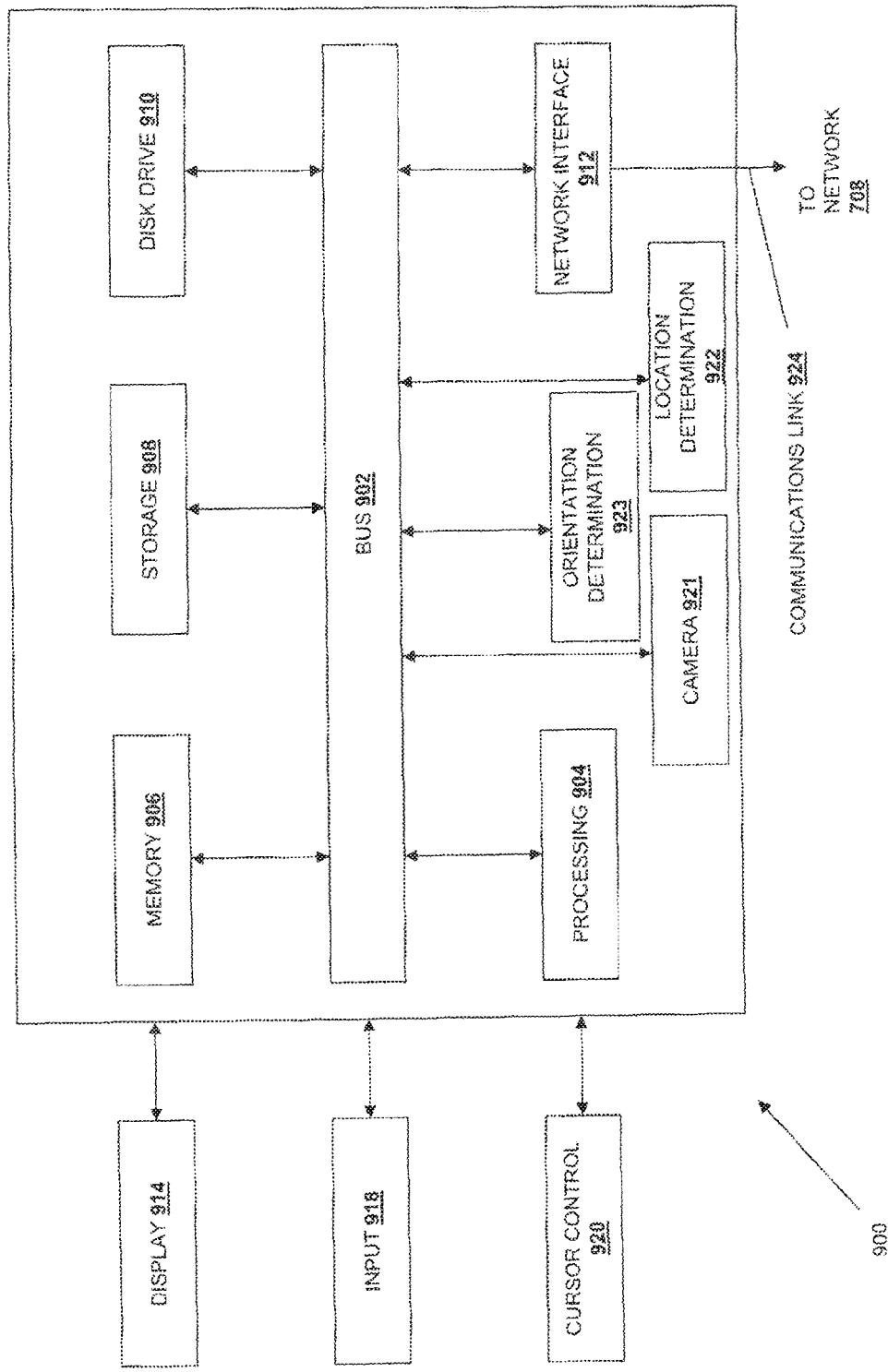
FIG. 9 is a schematic view illustrating an embodiment of a computer system.

Referring now to FIG. 9, an embodiment of a computer system 900 suitable for implementing, for example, the user device 200, the user device 702, the user device 800, the language translation device 704, and/or the currency conversion device 706, is illustrated. It should be appreciated that other devices utilized by users, language translation providers, and currency conversion providers in the translation system discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), a camera 921, a location determination component 922 (e.g., a Global Positioning System (GPS) device as illustrated, a cell tower triangulation device, and/or a variety of other location determination devices known in the art), and/or an orientation determination component 923 (e.g., a gyroscope) In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the user device 200, 702, and 800, the language translation device 704, and/or the currency conversion device 706. Such instructions may be read into the system memory component 906 from another computer readable medium, such as the static storage component 908 or the disk drive component 910. In other embodiments, hard-wired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 900. In various other embodiments of the present disclosure, a plurality of the computer systems 900 coupled by a communication link 924 to the network 708 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Figure 10:
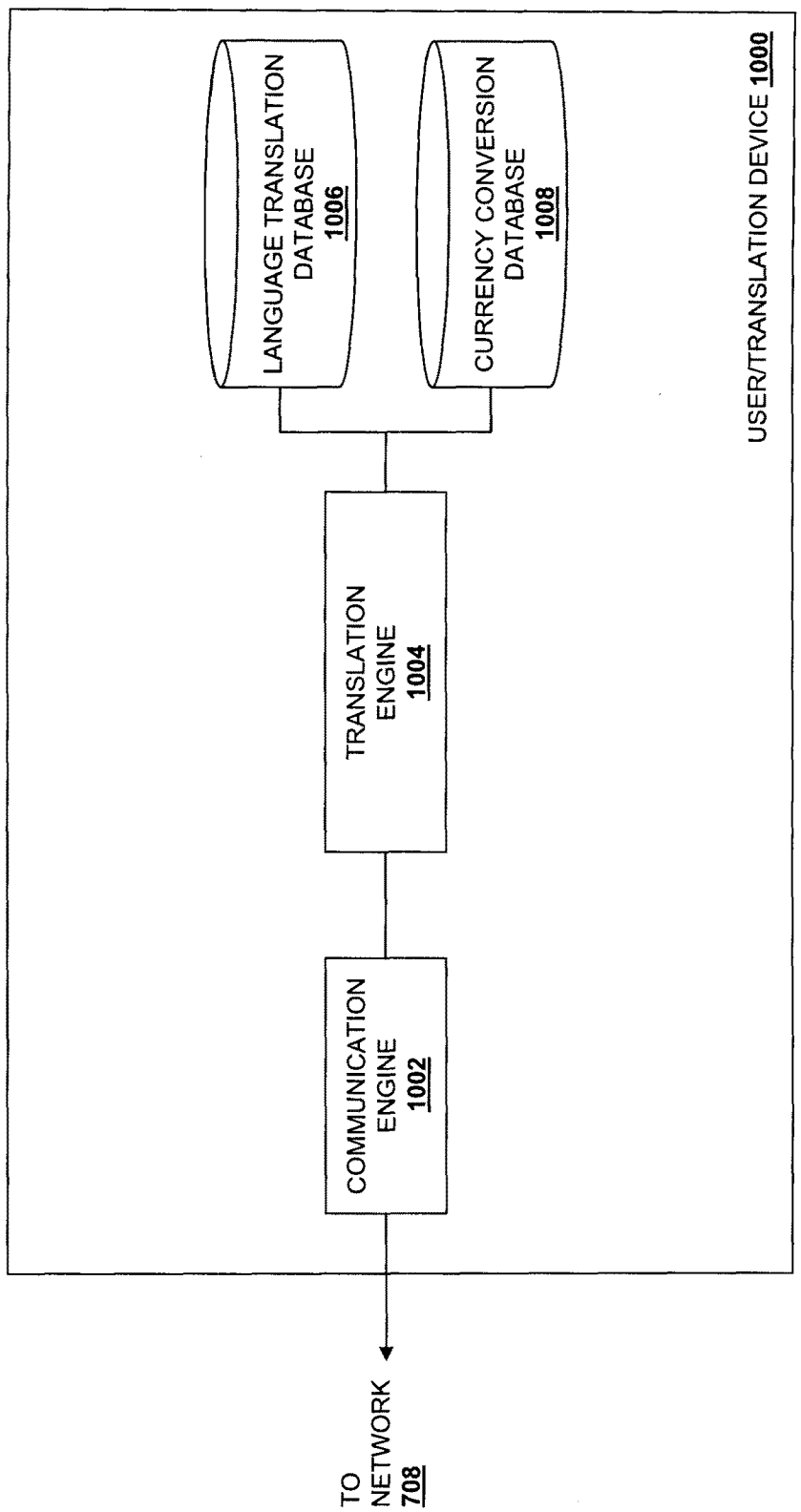
FIG. 10 is a schematic view illustrating an embodiment of a user device or translation device.

Referring now to FIG. 10, an embodiment of a user device/translation device 1000 is illustrated. In an embodiment, the device 1000 may be the user device 200, 702, and 800, the language translation device 704, the currency conversion device 706, and/or combinations thereof. The device 1000 includes a communication engine 1002 that is coupled to the network 1010 and to an translation engine 1004 that is coupled to each of a language translation database 1006 and a currency conversion database 1008. The communication engine 1002 may be software or instructions stored on a computer-readable medium that allows the device 1000 to send and receive information over the network 708. The translation engine 1004 may be software or instructions stored on a computer-readable medium that is operable to receive content associated with a first region display mode and use the language translation database 1006 and/or the currency conversion database 1008 to translate the content using a second region display mode to provide translated content. In an embodiment, the translation engine 1004 may be operable to receive signals from the orientation determination component 923 and determine when the predetermined orientation of the user device has been provided. In some embodiments, the translation engine 1004 may be operable to perform character recognition techniques on images provided to the user device, and may be operable to perform voice recognition techniques on audio files provided to the user device. While the databases 1006 and 1008 have been illustrated as located in the user device 1000, one of skill in the art will recognize that they may be connected to the translation engine 1004 through the network 708 without departing from the scope of the present disclosure. For example, the language translation database 1006 may be provided in the language translation device 704, and the currency conversion database 1008 may be located in the currency conversion device 706.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A language translation system, comprising:
a non-transitory memory; and
one or more hardware processors coupled to the non-transitory memory and configured to read instructions from the non-transitory memory to cause the system to perform operations comprising:
receiving, using a microphone, an audible phrase spoken in a first language;
performing a voice recognition process to convert the audible phrase into a plurality of text in the first language;
providing for display, on a display device when a first orientation is reported by an orientation detection device, the plurality of text in the first language and a first directional reading format;
detecting, using the orientation detection device, a reorientation from the first orientation to a predefined orientation that is rotated relative to the first orientation;
translating, in response to the detecting of the reorientation to the predefined orientation, the plurality of text from the first language to a second language; and
providing for display, on the display device in response to the detecting of the reorientation to the predefined orientation, the plurality of text in the second language and a second directional reading format that is different than the first directional reading format.

2. The system of claim 1, wherein the operations further comprise:
determining that a second region display mode is associated with the predefined orientation; and
determining that the second language is associated with the second region display mode and, in response, translating the plurality of text from the first language to the second language.

3. The system of claim 1, wherein the operations further comprise:
determining, using a location determination device, a current location of the user device; and
determining that the second language is associated with the current location and, in response, translating the plurality of text from the first language to the second language.

4. The system of claim 1, wherein the operations further comprise:
producing, using a speaker, the audible phrase in the second language.

5. The system of claim 1, wherein the providing the plurality of text in the second language for display includes:
providing, for display on the display device, a graphical user interface that includes the plurality of text in the second language, and an indication that the plurality of text has been translated from the first language to the second language.

6. The system of claim 1, wherein the operations further comprise:
providing, for display on the display device, a graphical user interface that includes the plurality of text in the second language, and a virtual keyboard in the second language.

7. A method for translating between languages, comprising:
receiving, by a user device using a microphone, an audible phrase spoken in a first language;
performing, by the user device, a voice recognition process to convert the audible phrase into a plurality of text in the first language;
providing for display, by the user device on a display device when the user device is in a first orientation, the plurality of text in the first language and in a first directional reading format;
detecting, by the user device using an orientation detection device, a reorientation of the user device from the first orientation to a predefined orientation of the user device that is rotated relative to the first orientation;
translating, by the user device in response to the detecting of the reorientation to the predefined orientation, the plurality of text from the first language to a second language; and
providing for display, by the user device on the display device in response to the detecting of the reorientation to the predefined orientation, the plurality of text in the second language and a second directional reading format that is different than the first directional reading format.

8. The method of claim 7, wherein the audible phrase in the second language is generated by the user device using the plurality of text in the second language.

9. The method of claim 7, further comprising:
determining, by the user device, that a second region display mode is associated with the predefined orientation; and
determining, by the user device, that the second language is associated with the second region display mode and, in response, translating the plurality of text from the first language to the second language.

10. The method of claim 7, further comprising:
determining, by the user device using a location determination device, a current location of the user device; and
determining, by the user device, that the second language is associated with the current location and, in response, translating the plurality of text from the first language to the second language.

11. The method of claim 7, further comprising:
producing, by the user device using a speaker, the audible phrase in the second language.

12. The method of claim 7, wherein the providing the plurality of text in the second language for display includes:
providing, by the user device for display on the display device, a graphical user interface that includes the plurality of text in the second language, and an indication that the plurality of text has been translated from the first language to the second language.

13. The method of claim 7, further comprising:
providing, by the user device for display on the display device, a graphical user interface that includes the plurality of text in the second language, and a virtual keyboard in the second language.

14. A non-transitory machine-readable medium having stored thereon machine-readable instruction executable to cause a machine to perform operations comprising:
receiving, using a microphone, an audible phrase spoken in a first language;
performing a voice recognition process to convert the audible phrase into a plurality of text in the first language;
providing for display, on a display device when a first orientation is reported by an orientation detection device, the plurality of text in the first language and in a first directional reading format;

detecting, using the orientation detection device, a reorientation from the first orientation to a predefined orientation that is rotated relative to the first orientation;

translating, in response to the detecting of the reorientation to the predefined orientation, the plurality of text from the first language to a second language; and providing for display, on the display device in response to the detecting of the reorientation to the predefined orientation, the plurality of text in the second language and in a second directional reading format that is different than the first directional reading format.

15. The non-transitory machine-readable medium of claim 14, wherein the audible phrase in the second language is generated by the user device using the plurality of text in the second language.

16. The non-transitory machine-readable medium of claim 14, wherein the operations further comprise:

determining that a second region display mode is associated with the predefined orientation; and determining that the second language is associated with the second region display mode and, in response, translating the plurality of text from the first language to the second language.

17. The non-transitory machine-readable medium of claim 14, wherein the operations further comprise:

determining, using a location determination device, a current location of the user device; and determining that the second language is associated with the current location and, in response, translating the plurality of text from the first language to the second language.

18. The non-transitory machine-readable medium of claim 14, wherein the operations further comprise:

producing, using a speaker, the audible phrase in the second language.

19. The non-transitory machine-readable medium of claim 14, wherein the providing the plurality of text in the second language for display includes:

providing, for display on the display device, a graphical user interface that includes the plurality of text in the second language, and an indication that the plurality of text has been translated from the first language to the second language.

20. The non-transitory machine-readable medium of claim 14, wherein the operations further comprise:

providing, for display on the display device, a graphical user interface that includes the plurality of text in the second language, and a virtual keyboard in the second language.

* * * * *